United States Patent [19]

Dale, Jr.

[11] Patent Number: 4,836,483
[45] Date of Patent: Jun. 6, 1989

[54] SUPPORT MECHANISM FOR INSECT REPELLANT HOLDER

[76] Inventor: William Dale, Jr., 727-B Grove St., Avoca, Pa. 18641

[21] Appl. No.: 199,050

[22] Filed: May 26, 1988

[51] Int. Cl.⁴ .................................. A47B 96/06
[52] U.S. Cl. ........................ 248/231.6; 248/201
[58] Field of Search ............ 248/231.6, 201, 207, 248/218.4, 219.1, 219.3, 220.2, 223.3, 231.1, 316.6, 316.8, 311.2; 211/89; 43/144, 131

[56] References Cited

U.S. PATENT DOCUMENTS

| | | | |
|---|---|---|---|
| 2,681,164 | 6/1954 | Kalfen | 248/311.2 X |
| 4,100,912 | 7/1978 | Doane | 248/311.2 X |
| 4,139,173 | 2/1979 | Kahn | 248/231.6 X |
| 4,222,541 | 9/1980 | Cillis | 248/311.2 X |
| 4,659,044 | 4/1987 | Armstrong | 248/218.4 |

*Primary Examiner*—Ramon O. Ramirez
*Attorney, Agent, or Firm*—John E. McRae

[57] ABSTRACT

A support device for a bug repellant holder, wherein the device is attachable to a conventional wrought iron railing. Vertical posts in the railing serve as attachment points as well as confining mechanisms for the bug repellent holder.

12 Claims, 1 Drawing Sheet

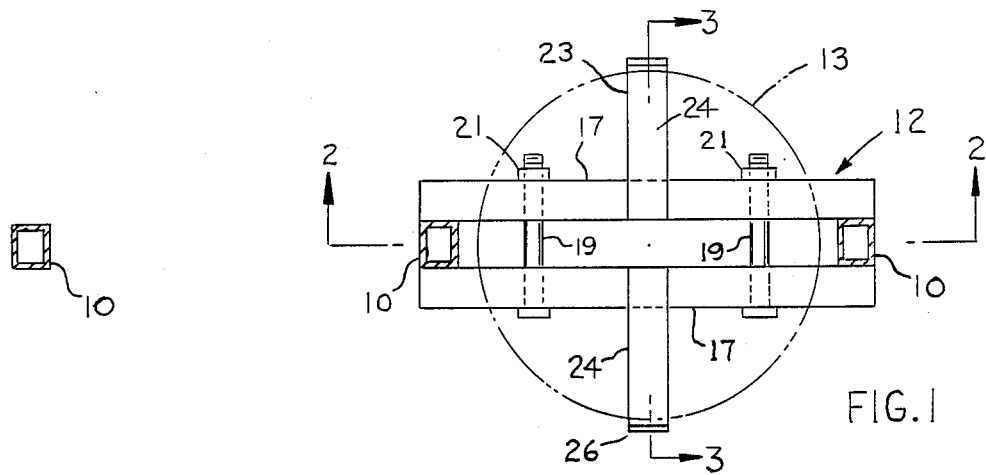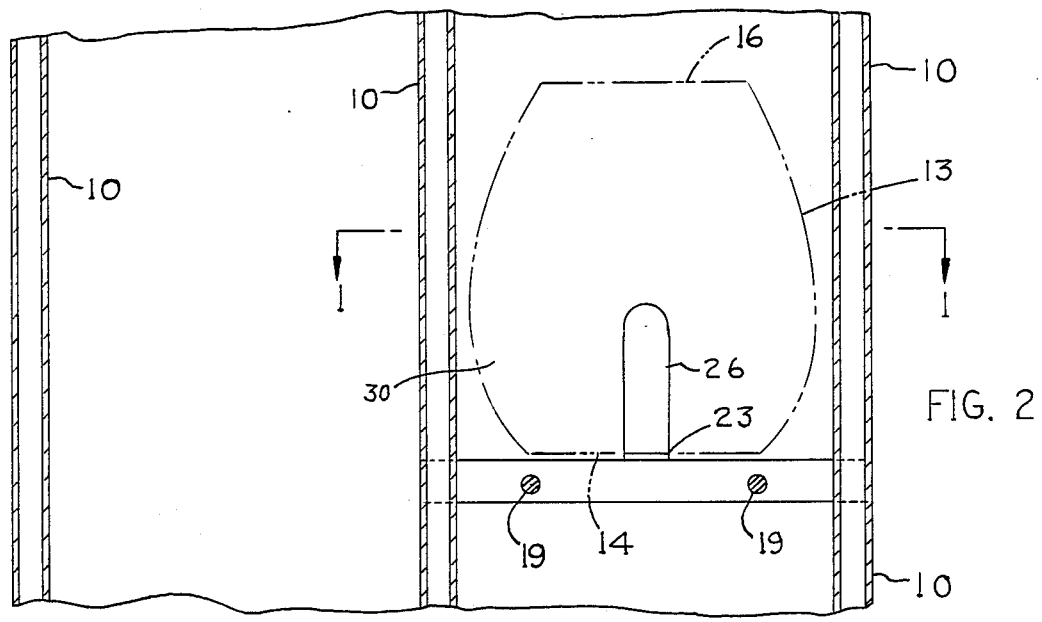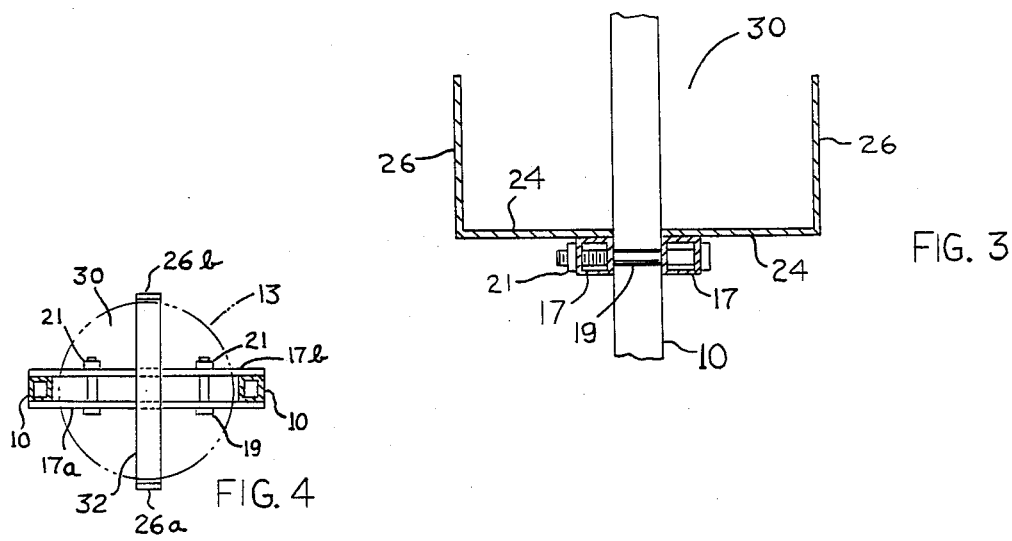

SUPPORT MECHANISM FOR INSECT REPELLANT HOLDER

BACKGROUND OF THE INVENTION

Various insect repellant devices have been used to provide insect (bug) free atmospheres outside homes or apartments, e.g. on porches or patios. One common insect repellant device is a citronella candle contained in an open-topped jar; a wick extends upwardly from the wax-citronella mixture within the jar. The wick is lighted to melt the wax and vaporize the citronella into insect-repellant form. One or more of these open-topped jars is/are positioned in or near the area requiring protection from bugs and insects.

SUMMARY OF THE INVENTION

My invention relates to a low-cost mechanism for supporting these insect-repellant devices on a railing, e.g. a porch railing or patio enclosure railing.

A particular aim of the invention is to provide a support mechanism that can be attached to the railing without drilling holes in the railing or making any modifications in the railing structure. A related object is to provide a support mechanism that can be easily removed from the railing when it is not needed, e.g. during winter months or when the user is changing his/her residence, without leaving any marks on the railing structure.

Another object of the invention is to provide a support mechanism that utilizes pre-existing vertical posts in the railing to partially circumscribe (contain) the insect repellant holder. In a sense, I have devised a unique railing-support mechanism assembly.

A further object is to provide an unobtrusive support mechanism that blends into the railing structure decor. The ornamental characteristics of the railing are preserved to a great extent.

Another object is to provide a support mechanism that can be mounted at different heights (locations), on the railing, according to individual desires or optimum positions for bug repellent action.

THE DRAWINGS

FIG. 1 is a top plan view of a support mechanism embodying my invention. The mechanism is shown in a position installed on a porch (or ratio) railing.

FIG. 2 is a sectional view taken on line 2—2 in FIG. 1.

FIG. 3 is a sectional view taken on line 3—3 in FIG. 1.

Fig. 4 is a view similar to Fig. 1, but illustrating a second form that the invention might take.

DESCRIPTION OF A PREFERRED EMBODIMENT

The drawings fragmentarily shows a conventional porch (or patio) railing that comprises a number of vertical metal posts 10 evenly spaced in the horizontal direction. Each post is commonly about thirty inches high; the upper and lower ends of the posts are welded (or otherwise connected) to horizontal rails, not shown. Usually the posts are formed out of metal tubing having a square cross section. The outer surfaces of the posts and rails ar usually painted dull black to give the railing a pleasing appearance.

My invention relates to a mechanism 12 for supporting an insect repellant holder 13 in the space between two adjacent posts (any two adjacent posts). Holder 13 is a globe-like container (formed of glass or plastic) having a generally flat bottom wall 14 and an open top 16. A wax-citronella mixture is contained within container 13 for generating a vaporous bug repellant gas (when ignited by a wick embedded in the wax mass).

Mechanism 12 comprises two horizontal bars 17 extending between two posts 10. Each bar is slightly longer than the post spacing, such that end areas of the bars overlap side surfaces of the posts. The bars are arranged on opposite sides of the railing, such that each of the two posts 10 is located between end areas of the two bars.

Two bolts 19 extend through aligned holes in bars 17. A nut 21 is screwed onto each bolt, such that bars 17 are clamped against outer side faces of posts 10. The nuts can be unscrewed from the bolts when/if it is desired to remove mechanism 12 from the railing.

Support mechanism 12 includes two L-shaped brackets 23 secured to bars 17 (one bracket for each bar). Each bracket is formed of flat strip material (e.g. steel) bent into an L-shape to provide a horizontal leg 24 and vertical leg 26. One end area of each horizontal leg 24 is welded or otherwise adhered to an upper flat face area of the associated bar 17. Each bar 17 is a hollow metal tube having a square cross-section (FIG. 3).

Vertical legs 26 are spaced apart by a distance that is only slightly greater than the outside diameter of insect repellant holder 13. Holder 13 can be readily placed in the space circumscribed by bracket legs 26.

At the time I conceived this invention I discovered that in conventional wrought iron railings the vertical posts are commonly spaced apart approximately four and three quarter inches. It so happens that citronella bug repellant holders have diameters approximately four and one half inches. Thus, the citronella holders can be conveniently fitted into the space between adjacent posts 10. The posts cooperate with bracket legs 26 to circumscribe a central space 30 sized to accommodate holder 10.

My invention contemplates a low cost support mechanism that can blend into the ornamental decor of conventional wrought iron railings. The bars 17 and brackets 23 are preferably painted a dull black to harmonize with posts 10. The square cross section of bars 17 is similar to the square cross section of posts 10, such that the bars appear to be integral parts of the railing (not separate add-on devices). Brackets 23 have flat surfaces conforming to the flat surfaces on posts 10, such that brackets 23 do not alter the general appearance of the railing structure. Support mechanism 12 has a "built-in" appearance that preserves the ornamental appearance of the railing.

FIG. 4 illustrates another form of the invention wherein two solid flat rectangular cross section bars 17a and 17b are used in place of the two tubular bars 17. Bars 17a and 17b are clamped to posts 10 by means of threaded connector means 19, 21.

The two angle elements 23 are replaced by a single U-shaped element 32 that is welded or otherwise attached to the upper edge of bar 17a at a point midway along the bar length. Element 32 includes two upstanding arms 26a and 26b that circumscribe a central space 30 sized to receive the insect repellent holder 13. Element 32 overlies bar 17b without being connected thereto.

I claim:

1. In combination with an upstanding railing that includes horizontally spaced vertical posts; the improvement comprising means for supporting an insect repellant holder in the space between two adjacent posts; said support means comprising two horizontal bars spanning the post-to-post space, with end areas of the bars overlapping the posts; threaded connector means extending through the horizontal bars, whereby said bars are clamped to the posts; and an upstanding bracket carried by each bar; the two brackets and two adjacent posts circumscribing a space that is sized to accommodate an insect repellent holder.

2. The improvement of claim 1 wherein each bar is a hollow tube having a square cross section.

3. The improvement of claim 2 wherein each bracket is L-shaped.

4. The improvement of claim 3 wherein each L-shaped bracket is attached to the associated bar at a point midway along the bar length.

5. In combination with a railing comprised of a plurality of horizontally spaced vertical posts: the improvement comprising a support mechanism for an insect repellant container, said mechanism including two parallel horizontal bars having end areas thereof engaging outer side faces of two adjacent posts; threaded connector means extending between the horizontal bars, whereby said bars are removably clamped to said two adjacent posts; and a bracket structure connected to at least one of the horizontal bars at a point midway along the bar length; said bracket defining a horizontal support surface designed to underlie the insect repellant holder and two upstanding arms designed to extend along side surface areas of the insect repellant holder.

6. The improvement of claim 5 wherein said bracket structure comprises a U-shaped element secured to one of the bars.

7. The improvement of claim 5 wherein said bracket structure comprises two L-shaped elements secured to different ones of the bars.

8. The improvement of claim 5 wherein the bars are hollow square cross-sectioned tubes.

9. The improvement of claim 5 wherein the bars are flat solid rectangular cross-section bars positioned flatwise against outer side faces of the posts.

10. In combination with an upstanding railing that includes horizontally spaced vertical posts: the improvement comprising means for supporting an insect repellant holder in the space between two adjacent posts; said support means comprising first and second horizontal bars extending between two adjacent posts, with end areas thereof overlapping the post side surfaces; said first and second bars being arranged to engaged opposite side surfaces of the respective posts; and an L-shaped bracket secured to each bar at a point midway along the bar length; each L-shaped bracket including a first horizontal leg extending right angularly from the associated bar, and a second vertical leg extending upwardly from the end of the first leg remote from the associated bar; the two upstanding legs and adjacent posts circumscribing a space that is sized to accommodate an insect repellent holder.

11. The improvement of claim 10 wherein each bar is a hollow tube having a square cross section; each L-shaped bracket having its horizontal leg adhered to an upper flat face area of the associated bar.

12. The improvement of claim 11 wherein each L-shaped bracket is formed out of flat strip stock, each flat strip being arranged with a flat face thereof in facial engagement with an upper flat face area of the associated bar.

* * * * *